United States Patent Office 2,701,532
Patented Feb. 8, 1955

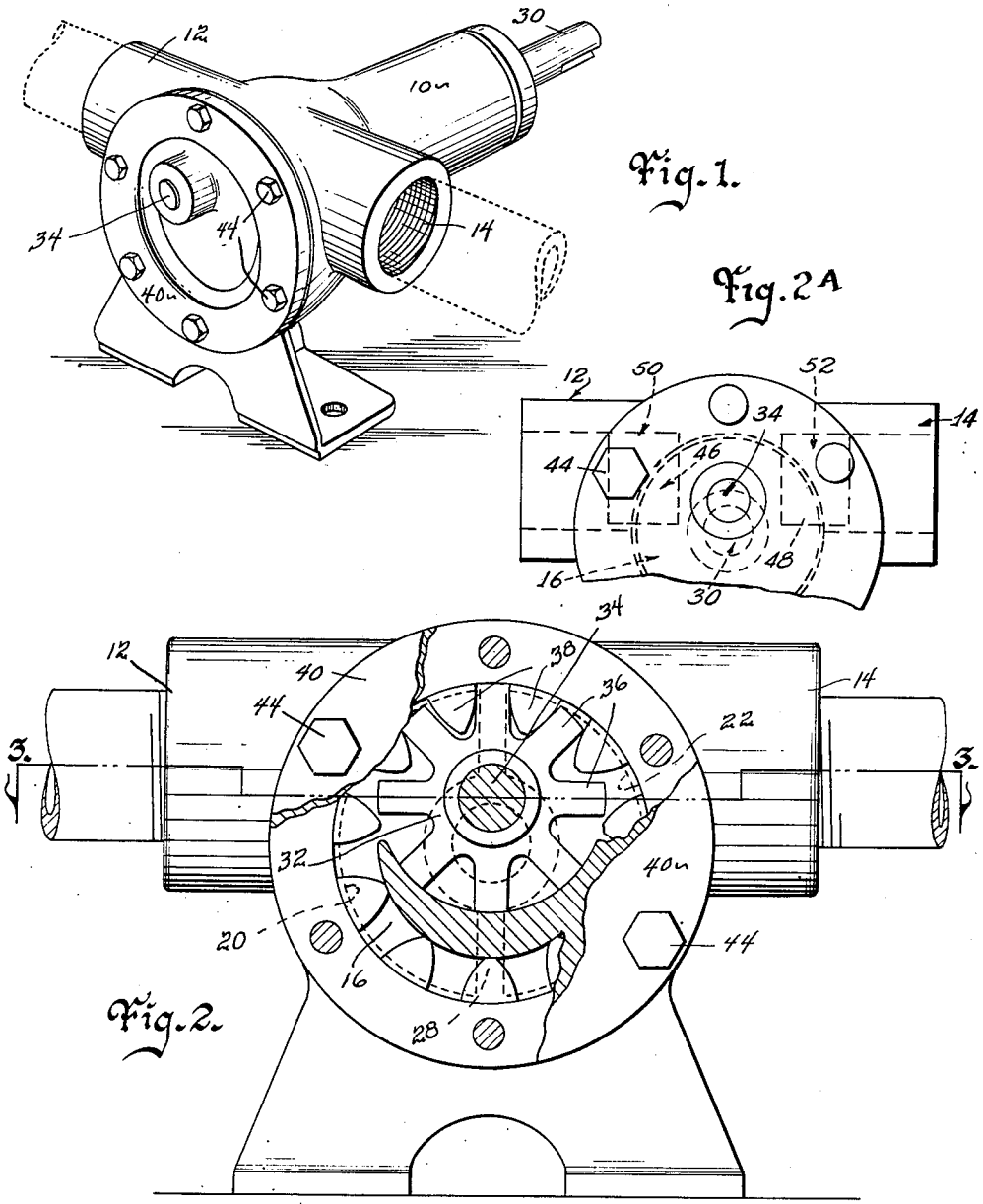

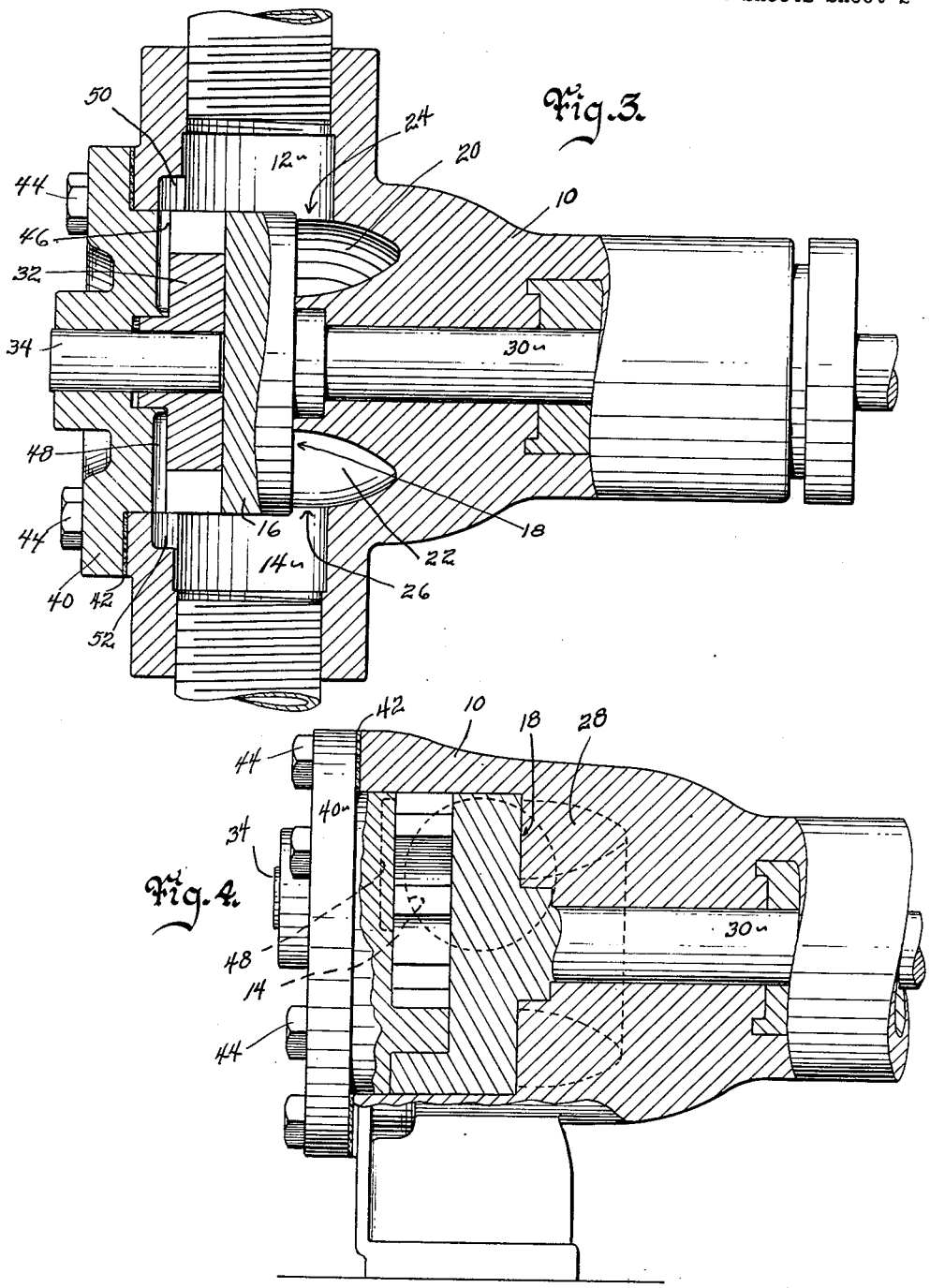

2,701,532

MEANS FOR MINIMIZING WEAR OF INTERNAL EXTERNAL GEAR PUMPS

William E. Bakewell, Cedar Falls, Iowa

Application May 8, 1952, Serial No. 286,771

2 Claims. (Cl. 103—126)

My invention relates to the art of internal external type gear pumps and specifically is a means for reducing loss of pumping efficiency resulting from canting the gears in pumps of this type. This application is a continuation in part of my abandoned application Serial Number 738,183, filed March 29, 1947.

Internal external gear pumps, hereafter abbreviated to I. E. G. pumps, have been known and used for a long time. They are efficient units, particularly for high pressure work, as long as they are operating as intended. Whenever the sliding fit between the external gear and the case is such as to cause leakage from the front to the back of the external gear, however, the conventional I. E. G. pump deteriorates rapidly. The rate of wear increases enormously and in a short time after leakage has once started, the pump is incapable of producing its normal operating pressures easily and perhaps not at all.

In the conventional I. E. G. pump the external gear is supposed to exclude all liquid moved by the pump from the area behind it by maintaining a sliding fit seal between its rear periphery and the housing. Thus the pressure behind the gear is the same on both sides under optimum operating conditions for the conventional I. E. G. pump. On the front face of the external gear, however, we have widely differing pressures on its two halves. On one half of the external gear are intake pressures and on the other outlet pressures. If this were not so the pump would not be accomplishing anything. Consequently in the optimum situation for the conventional I. E. G. pump, we have forces exerted tending to cant the external gear. Outlet pressures working against the common pressure behind the external gear creates one pressure differential. The inlet pressures working against common pressure behind the external gear produces a different pressure differential. As outlet pressures are greater than inlet pressures, the external gear tends to be forced rearwardly on the pressure side; and because it is rigid, it naturally moves forward at the other side. The movement just described is accentuated if the pump is subject to load suddenly. Even if the system in which the pump is used is equipped with a pressure relief valve, sudden loads can cause momentary peak loads far in excess of the value at which the relief valve is set. The force applied tending to cant the external gear, therefore, can be very great at times. In fact, a sudden force applied in this manner will cause greater movement than would the same force applied with gradually increasing force, as there is an impact force applied as a result of the velocity of liquid being pumped before the load is applied.

Any canting of the external gear tends to alter tolerances at the point where the rear periphery of the external gear and the housing are supposed to maintain a sliding seal. As these tolerances must be maintained within close limits to avoid leakage, canting of the external gear will usually cause some leakage. Also once leakage has started, it will usually get more pronounced as time goes by. Whether the leak that occurs vents the rear of the external gear to inlet or outlet pressures makes little difference to the final outcome as to pump operation. If the entire rear of the external gear is subjected to outlet pressures, the external gear tends to be moved toward the front of the gear case with resulting undesirable wear. Likewise undesirable wear is the result if the entire rear of the external gear has only inlet pressures applied the gear tends to be moved to the rear of the pump housing, because the total pressure at the rear of gear will be less than the combined inlet and outlet pressures exerted on the face. Either of these motions causes great pressures to be exerted on the shaft bearings. In fact to resist these pressures specially designed and relatively expensive bearings must be used. The expense of these bearings makes the cost of the pump very high and in some cases prohibitive. Failure to use these special bearings results in frequent pump failure which is also undesirable. Obviously the user of the conventional gear type pump is faced with a dilemma. Either he must secure a relatively expensive device or one that will need frequent replacement.

Many attempts have been made to avoid the necessity of making either of these unhappy choices. Most of the devices that have been developed, however, have been so relatively complex that there is little advantage in them from the handpoint of original cost when compared to the pump provided with special thrust bearings. In many cases the pump housing has been provided with a plurality of precision opening passageways and what amounts to rotary valve actions that causes them to be even more expensive than a pump provided with the special bearings. Many of these pumps worked well when new but became clogged readily when pumping heavy liquids. This was particularly true if the liquid carried impurities. Some advantage was gained by these pumps in that when they were operating properly, they avoided much of the gear canting friction which caused the pump to require less power to operate it. If the pump operated for a relatively long period of time without involving extra maintenance expense, the savings in power cost would more than offset any extra original cost. It cannot be said that these complex pumps are without merit. It is my opinion, however, that there was considerable room for improvement as the situation existed prior to my invention.

In view of the foregoing, therefore, it is the principal object of my invention to provide a means for minimizing wear of internal external gear pumps that will avoid excessive wear on the external gear.

It is a further object of my invention to provide a means for minimizing wear of internal external gear pumps that avoids excessive wear on the housing.

It is a further object of my invention to provide a means for minimizing wear of internal external gear pumps that does not over burden the pump bearings.

It is a still further object of my invention to provide a means for minimizing wear of internal external gear pumps that is economical to manufacture, operate and maintain.

These and other objects will be apparent to those skilled in the art.

My invention consists in the construction, arrangement, and combination of the various parts of the device, whereby the objects contemplated are attained as hereinafter more fully set forth, and specifically pointed out in my claims, and illustrated in the accompanying drawings, in which:

Fig. 1 is a perspective view of a pump equipped with means for minimizing wear of internal external gear pumps with broken lines illustrating conduits connected to it.

Fig. 2 is an enlarged front elevational view of a pump equipped with means for minimizing wear of internal external gear pumps with a portion of the device broken away to illustrate more fully its construction. Broken lines illustrate the arrangement of the chambers at the rear of the external gear separated by the divider.

Fig. 2A is a fragmentary front elevational view showing the separate wells 46, 48 in the front cover.

Fig. 3 is an enlarged partial horizontal longitudinal sectional view of my pump equipped with means for minimizing wear of internal external gear pumps taken on the line 3—3 of Fig. 2.

Fig. 4 is an enlarged partial vertical sectional view of a pump equipped with means for minimizing wear of internal external gear pumps. Broken lines illustrate the port location of one of the pressure balancing chambers and the gear face volume by-passes at the forward end of the external gear.

Referring to the drawings, I have used the numeral 10 to designate the pump housing having two ports designated 12 and 14, respectively. For right-hand or clockwise rotation of the external gear 16 as viewed in Fig. 2, port 12 will be the outlet or high pressure port and 14 the inlet or low pressure port. Throughout this discussion the rotation of the external gear 16 and the relative pressures at the ports 12 and 14 will be assumed as indicated above. The external gear 16 is not unlike such gears in conventional pumps except that it is flat on its rear designated 18. Most conventional gears are relieved on their rear portions to make them lighter. At the inside rear of the housing are a pair of semi-circular or half ring form chambers designated 20 and 22 and shown most clearly in Fig. 3. These chambers are so positioned relative to the ports as to cause the perimeters of the ports 12, 14 to intersect the forward portion of the respective chambers 20, 22 forming openings or passageways connecting the ports to their respective chambers. Liquid under outlet pressure can pass at the point designated 24, for example, from port 12 into chamber 20. Chamber 22 and port 14 are connected by a passageway designated 26 similar to the one designated 24. Separating the chambers 20 and 22 from each other is the vertical partition or divider 28. The divider 28 is positioned on the axis of pivot of external gear 16 for any canting action of the latter. For that reason, just as center seating in an automobile is a smoother ride, it is easier to hold the tolerances between the outer face of the divider 28 and the rear 18 of the gear 16. The external gear 16 is secured to any suitable drive shaft such as the one designated 30. Inside the external gear is the internal gear 32 which is appropriately journalled on stub shaft 34. The internal gear teeth 36 fit in between the teeth 38 of the external gear and the movement of the latter gear drives the former as a result of their being meshed as in the conventional pump. The internal gear is mounted eccentrically as in the conventional pump. Stub shaft 34 is rigidly secured in the cover plate 40 at the front of the pump housing. A gasket 42 creates a liquid tight seal between the cover and the housing whenever the cover plate securing means such as cap screws 44 are tightened. Cover 40 is provided with separate wells 46 and 48 which may be of generally segmental or other form, as indicated in Fig. 2A, and which connect to the housing ports 12 and 14 by means of the port extensions 50 and 52. These walls 46, 48 on the forward side of the gears are for the puryose of allowing liquid to reach the face of the gears 16, 32 as well as the sides. The pump is therefore able to pump a large volume of liquid without building up pressure inside the gears 16, 32. The cover 40 also carries the usual crescent (see Fig. 2) to fill the space between the gear teeth 36, 38 on the liquid carrying portion of the rotation of the gears. The cover plate 40 also separates the space nearer to the inlet port from the area nearer to the outlet port as is clearly shown in Fig. 4.

The clearances between all the moving parts (which is to say between gear 32 and cover 40; between gears 16, 32; and between the back 18 of gear 16 and divider 28) provide space for a film of liquid to lubricate the pump mechanism during operation. This film also means that all surfaces of the gears 16, 32 are subjected to liquid pressures of some kind. Naturally, the seal, as aforenoted, between the rear 18 of the external gear 16 and the divider 28 is not absolutely liquid tight. The resistance to liquid flow is so great, however, that the pressure drop that occurs on any liquid that passes from the high to the low pressure side of divider 18 will maintain the pressure differential that permits the pump to operate efficiently. This close tolerance fit that causes the liquid that does pass to the low pressure side to lose its pressure head is commonly referred to generally and will be also referred to here as a sliding liquid tight seal. It is a seal against pressure drop on the pressure side of the pump. In short the pressures existing in chamber 22 at port 14 and well 48 are the same. Likewise the pressures in chamber 20 at port 12 and in well 46 are also identical to each other. Consequently, all the space at the left of divider 28 as viewed in Fig. 2 is subjected to outlet or pumping pressures. The space on the right of the divider 28 on the contrary is subjected only to inlet pressures. Since the entire left side of the device is subjected to pumping pressure while the opposite side is subjected to only inlet pressures, there is a force exerted on the moving parts of the pump tending to move them toward the inlet port. Such force has been demonstrated by field tests to be of little or no significance in terms of the useful life of the pump. Because of this same structure, however, canting forces tending to rock the gears 16, 32 to the left or right as seen in Fig. 3, are materially reduced if not eliminated altogether. Since both the front and the back of one side of the gears 16, 32 are subjected to pumping pressures, and the area on both the front and the back of said gears that is available for liquid to exert axial pressures is equal, the total force exerted on the front (left, Fig. 3) tending to move the external gear rearwardly (right, Fig. 3) exactly equals the opposed forces exerted on the rear of the gears 16, 32. In other words, the wells 46, 48 and the related post extensions 50, 52 expose the same area at the front of the gears 16, 32 as do the chambers 20, 22 and related passageways 24, 26 at the rear thereof, consequently canting forces are eliminated at least theoretically. Although I have described the divider 28 as straight on its forward edge and the external gear as flat backed, it is apparent from the description of the operation of the device that such structure is not essential to the operation of the device. The sole necessity as to the divider 28 and the external gear back 18 is that they fit each other to form a so-called sliding seal. The rear of the gear could have any symmetrical form, therefore, if the contour of the leading edge of the divider were contoured to fit the rear of the external gear.

In actual field tests the following results were observed. One of these pumps equipped with the flat-backed external gear and the divider 28 making a slipping fit with the gear was installed in a stone quarry where conventional pumps had failed in the space of a few months regularly. The pump constructed as herein disclosed operated for a period of time that exceeded the usual life of a pump by four or five times. At the end of a period that more than quadrupled the usual pump life, the pump was completely disassembled and inspected. There were signs of wear but no indication of imminent failure of the pump. In another installation which required frequent replacement of conventional pumps it was found that by using pumps equipped with the flat back external gear and the divider, pump troubles have become a relatively minor problem. Previously the maintenance of pumps for the installation of my second example was a primary duty of the repair department. These examples are evidence tending to prove two things. They show that the lateral pressures exerted on the gears and referred to above produce no excessive wear that seriously shortens the useful life of the pump. They also show that by eliminating canting forces exerted on the gears, and that by placing the seal between the high pressure and low pressure sides of the pump at the canting pivot point of the gears in the conventional pump, the useful life of the pump is multiplied many times. It is also known that the pumps equipped with my invention require less power to operate them than do conventional pumps of the same size.

The final advantage of my invention is its relatively simple construction. There are only a relatively few changes that must be made in the design of a conventional type pump to make it a unit embodying my invention. The pump housing must be cast with the divider and with the ports connecting to the chambers. A machining step is required to face the foremost edge of the divider. The external gear must be made with a flat polished back. Clearly the changes from the conventional pump are slight and will require little or no added expense. Any additional cost of machining the divider will be compensated for by relative ease of machining it as compared to the machining required for the inside rear periphery of the conventional housing. In practice it has been found that these pumps can compete very favorably with conventional pumps as to price. Clearly I have invented a device that achieves the objects of my invention.

Some changes may be made in the construction and arrangement of my means for minimizing wear of internal-external gear pumps without departing from the real spirit and purpose of my invention, and it is my intention to cover by my claims, any modified forms of struc-

I claim:

1. In an internal-external gear type pump having a pumping chamber and meshing, eccentrically positioned exterior and interior gears therein and an inlet port and an outlet port communicating with said chamber with means in the housing adjacent the face of said gears for restricting inlet pressures to those face portions of the external gear that are nearer to said inlet port and for restricting outlet pressures to those face portions of the external gear that are nearer to said outlet port; said pump characterized by a rear chamber extension formed on the back side of said gears opposite to said face of said gears, the entire back side of said external gear being closed, a divider formed in said chamber extension and fixed to the back of said pump housing and extending to and forming a liquid tight sliding seal with the back side of said external gear; said divider separating said chamber extension along a line that separates those portions of the back of said external gear that are nearer to said inlet port from those portions of the back of said gear that are nearer to the outlet port; means for connecting the portion of said chamber extension which is nearer to said inlet port to inlet pressures, and means for connecting the portion of said chamber extension which is nearer to said outlet port to discharge pressures; whereby axial pressures exerted on the front and back portions of the external gear nearer to said outlet port are discharge pressures; and whereby all axial pressures exerted on the front and back of said portions of said external gear nearer to said inlet port are inlet pressures.

2. In an internal-external gear pump having a housing providing a substantially circular pumping chamber having front and rear walls and a fluid inlet and a fluid outlet port communicating with said chamber at remote peripheral points, the back of said housing providing two separate rear enlargements of said pumping chamber, one enlargement being nearer the inlet port and in open communication therewith and the other enlargement being nearer the outlet port and in open communication therewith, a forwardly extending divider partition extending between opposite peripheral portions of said chamber and carried by said casing back, said divider partition separating said rear chamber enlargements, an external gear journalled in said pumping chamber adjacent the back thereof, the entire back face of said external gear being closed and bearing against said outer end of said divider partition in the plane of the axis of said gear, an internal gear smaller than said external gear and eccentrically journalled in said housing with respect to said external gear and adjacent the front housing wall, the front housing wall providing two separate front chamber enlargements, one of the latter being nearer the inlet port and in open communication therewith and the other front chamber enlargement being nearer the outlet port and in open communication with the latter, each of said front chamber enlargements having a gear-facing area approximating that of said rear chamber enlargements, and means connecting one of said gears to a source of power.

References Cited in the file of this patent

UNITED STATES PATENTS

| | | |
|---|---|---|
| 1,636,259 | Sweeney | July 19, 1927 |
| 1,732,871 | Wilsey | Oct. 22, 1929 |
| 1,768,818 | Bock | July 1, 1930 |
| 1,970,146 | Hill | Aug. 14, 1934 |
| 2,373,368 | Witchger | Apr. 10, 1945 |
| 2,531,808 | Eames | Nov. 28, 1950 |